US 6,660,163 B2

(12) United States Patent
Miklos

(10) Patent No.: US 6,660,163 B2
(45) Date of Patent: Dec. 9, 2003

(54) WASTE TREATMENT WITH CONTROL OVER BIOLOGICAL SOLIDS

(76) Inventor: Daniel Robert Miklos, 7525 Doe View Dr., West Chester, OH (US) 45069

( * ) Notice: Subject to any disclaimer, the term of this patent is extended or adjusted under 35 U.S.C. 154(b) by 146 days.

(21) Appl. No.: 09/798,313

(22) Filed: Mar. 2, 2001

(65) Prior Publication Data

US 2003/0173292 A1 Sep. 18, 2003

(51) Int. Cl.$^7$ ................................................. C02F 3/30
(52) U.S. Cl. ....................... 210/605; 210/614; 210/622; 210/629
(58) Field of Search ................... 210/605, 614, 210/621–623, 630, 629, 202, 220, 259, 903, 908

(56) References Cited

U.S. PATENT DOCUMENTS

| | | | | |
|---|---|---|---|---|
| 3,907,672 A | * | 9/1975 | Milne | 210/605 |
| RE32,429 E | * | 6/1987 | Spector | 210/605 |
| 4,731,185 A | * | 3/1988 | Chen et al. | 210/605 |
| 4,891,136 A | * | 1/1990 | Voyt | 210/605 |
| 4,915,840 A | * | 4/1990 | Rozich | 210/605 |
| 5,019,266 A | * | 5/1991 | Soeder et al. | 210/605 |
| 5,342,522 A | * | 8/1994 | Marsman et al. | 210/605 |
| 5,531,896 A | * | 7/1996 | Tambo et al. | 210/605 |
| 5,626,755 A | | 5/1997 | Keyser et al. | 210/614 |
| 5,650,069 A | * | 7/1997 | Hong et al. | 210/605 |
| 5,658,458 A | | 8/1997 | Keyser et al. | 210/195.1 |
| 5,733,456 A | * | 3/1998 | Okey et al. | 210/605 |
| 5,833,856 A | * | 11/1998 | Liu et al. | 210/605 |
| 5,846,424 A | | 12/1998 | Khudenko | 210/603 |
| 5,919,367 A | * | 7/1999 | Khudenko | 210/605 |
| 6,004,463 A | | 12/1999 | Swett | 210/614 |
| 6,054,044 A | * | 4/2000 | Hoffland et al. | 210/96.1 |
| 6,066,256 A | | 5/2000 | Henry et al. | 210/614 |

FOREIGN PATENT DOCUMENTS

| | | |
|---|---|---|
| EP | 0106043 A2 | 4/1984 |
| EP | 02251108.3 | 2/2002 |

OTHER PUBLICATIONS

Chudoba, P. et al, "The Aspect of Energetic Uncoupling of Microbial Growth in the Activated Sludge Process: OSA System," Water Sci Tech. vol. 26, No. 9–11, pp. 2477–2480, 1992.

Westgarth W.C., et al, "Anaerobiosis in the Activated Sludge Process," Advances in Water Pollution Research, Proceedings of the Second IAWPRC Biennial, Tokyo, Japan, 1964, vol. 2, pp. 43–55.

Chudoba, P. et al, "The Case of Both Energetic Uncoupling and Metabolic Selection of Micro–organisms in the OSA Activated Sludge System", Environmental Technology 1992; 13:761–770.

* cited by examiner

Primary Examiner—Fred G. Prince
(74) Attorney, Agent, or Firm—Testa, Hurwitz & Thibeault, LLP

(57) ABSTRACT

Waste-treatment processes are enhanced through generation and introduction of specific biological populations customized to perform or favor specific tasks either during the main process, or for solids minimization purposes in a post-treatment process. These bacteria may be grown from specialized mixes of activated sludge and waste influent by exposing these materials to controlled environments (e.g., in an off-line treatment area). They may then be added back to the main process to perform certain tasks such as converting particulate cBOD into soluble cBOD for utilization, to reduce high solids yield organisms by supplementing the population with low yield organisms, to improve nitrification/denitrification efficiency, or to disfavor filamentous biology such as Norcardia sp.

44 Claims, 3 Drawing Sheets

WASTE TREATMENT WITH CONTROL OVER BIOLOGICAL SOLIDS

BACKGROUND OF THE INVENTION

1. Field of the Invention

The present invention relates to biological treatment of contaminated liquids and effluent, and more particularly to methods and apparatus for the creation and/or application of customized biology populations to biological processes such as wastewater treatment.

2. Description of the Related Art

Before being discharged to the environment, contaminated waters from municipal, commercial and industrial sources frequently must be treated to prevent harmful impacts. The treatment processes used are numerous and varied. A rudimentary conventional process is shown in FIG. 1. The treatment process will often begin with a coarse removal step 10, typically involving screening and grit removal. This may be followed by removal of sludge and solids in a primary clarifier 112. Frequently the sludge from the primary clarifier 112 is partially consumed in a digester 114, which recycles clear effluent back to the start of the process and diverts the unconsumed sludge to disposal.

The clear effluent from the primary clarifier 112 may be mixed with activated sludge and aerated in an aeration unit 118 before being fed to a secondary clarifier 120 for secondary treatment. The clear effluent overflowing the secondary clarifier 120 may be disinfected by a disinfecting unit 122 (which may apply, for example, chlorine or UV light), and discharged to a local waterway as effluent. The solids from the secondary clarifier 120 are generally thickened, e.g., by a filter press 124 and then sent off for disposal.

Biological processes are commonly used for the elimination of contaminants in the secondary treatment portion of the process, and may take many forms. They generally involve exposure of the waste stream to one or more forms of microorganisms that stabilize or digest various contaminants. The microorganisms to be favored by the particular treatment process implemented are chosen to complement the waste stream in terms of content, strength, the biochemical and chemical environment used for treatment, and the specific effluent requirements. For example, the activated sludge process utilizes aerobic bacteria that remove the soluble biological oxygen demand (BOD) from wastewater. Practice of this process generally involves conducting wastewater into an aeration basin containing a suspension of digestive microorganisms, thereby forming a "mixed liquor" that is aerated to furnish oxygen for consumption of the BOD, the formation of new biomass, and the respiration of biomass maintained in inventory; the biomass sorbs, assimilates and metabolizes the BOD of the wastewater. After a suitable period of aeration, the mixed liquor is introduced into the secondary clarifier 120 in which the biomass settles, allowing the treated wastewater to overflow into an outlet effluent stream. All or a portion of the biomass separated from the effluent in 120 is returned to 118 to treat additional influent.

The BOD provided by the waste acts as "food" for the microorganisms. The BOD may be measured and reported as total BOD that includes both nitrogenous (NBOD) and carbonaceous oxygen demand (cBOD) or separately as NBOD and cBOD. This BOD, especially the cBOD, may be present in particulate or soluble form. The propensity of a given organism to metabolize a particular form of NBOD or cBOD and the rate at which this is done are determined by both the local environmental conditions and the number of organisms of similar type. In addition to carbonaceous "food," microorganisms require certain macronutrients for survival, such as sodium, calcium, phosphorus, and/or nitrogen, and trace levels of micronutrients such as iron, sulfur, and/or manganese. Controlled and efficient removal of these macro and micronutrients from the waste stream by the treatment process may be an important component of its operation with respect to meeting local effluent disposal requirements. As these various materials are metabolized by the microorganisms they may reproduce, and the degradable portions of the influent are converted into gases and excess biology. The excess biology may consist of live and/or expired microorganisms and other organic materials, and will generally be disposed of as sludge at the terminal portion of the process. The clear effluent that remains is generally discharged to a local receiving water body.

The microorganisms selected for the elimination of the contaminants in the incoming waste stream may come from many sources. Most waste treatment processes treat their incoming waste with recycled biology populations obtained from a downstream portion of the process. Recycling of these microorganisms is convenient and inexpensive, but unfortunately does not readily lend itself to the customized matching or tailoring of a given biological population to the varying needs of the influent waste stream. The composition, effectiveness, and amounts of the various recycled populations of microorganisms are also affected by the feed composition present when they were generated, so they are especially impacted by changes in the flow compositions or influent concentrations. These problems are exacerbated by the limited amount of flexibility most treatment plants have in manipulating the factors that favor a desired biological population profile. The options frequently are limited to the wasting of a portion of the sludge or some of its associated water chemistry, in an attempt to drive the biological selection process to a particular population balance by controlling the average "age" of the population, balancing the slower growing, more efficient organisms with the faster growing, more responsive organisms.

Partially in response to this need for varied populations, in response to local effluent requirements, and in an effort to accelerate the treatment process, a waste treatment plant may treat the waste stream with a combination of biological environments generally within the secondary treatment portion of the process. While virtually all treatment schemes utilize several major classes of bacteria, including obligate aerobes, facultative aerobes, nitrifiers, obligate anaerobes, and facultative anaerobes, manipulation of the different environments within the particular scheme favor different classes of bacteria must compete with each other in the course of the treatment process. The results of this competition affect and effect the efficiency of the treatment process and the degree of treatment achieved in the final effluent.

Common to all of these processes, however, is generation of a waste stream of excess biology, generated because new growth is in excess of death and decay. In most instances that waste stream also will contain particulate, non-degradable organic and inorganic material in addition to the excess biology. Usually, the waste stream is removed as a portion of a solids recycle stream and it is directed to a terminal solids treatment process, thus minimizing the volume of excess waste solids that must be disposed of. The terminal treatment process functions primarily to concentrate and stabilize these materials for disposal and may include further biological treatment ("digestion") that specifically enhances general death and decay of biomass.

Both as described and as is generally practiced, the current waste treatment processes exhibit significant limitations. Conventional modes of operation do not allow microorganism populations to be tailored to the characteristics of a particular waste stream, which may change over time. Moreover, although minimizing the quantity of disposable solids is important to the performance of waste treatment systems, the ability to achieve low solids levels is impeded by the problems of excess biology and limited digestion, resulting in excessive operating costs, disposal costs, and potentially adverse environmental impacts.

SUMMARY OF THE INVENTION

The preceding problems are addressed by the generation and introduction of specific biology populations that are customized to perform or favor specific tasks either during the main waste treatment process, or for solids minimization purposes in a post-treatment process. These bacteria may be grown from specialized mixes of activated sludge and waste influent by exposing these materials to controlled growing environments (e.g., in an offline treatment area). They may then be added back to the main process to perform certain tasks such as converting particulate cBOD into soluble cBOD for utilization, reducing high solids yield organisms, improving nitrification/denitrification efficiency, or competitively suppressing filamentous biology such as Norcardia sp. Alternatively, the biological population generated may be customized to consume the generated solids residue in order to reduce the overall disposal volumes and costs.

In one aspect the invention provides for the treatment of a waste stream using a growth method that involves mixing a portion of the stream with activated sludge and then using controlled mixing, air exposure, residence time and settling sequences to create specialized population profiles. These specialized biological populations have characteristics that are useful for achieving particular desired results when treating the incoming waste, oftentimes in combination with (or as a pre-existing component of) the main treatment process.

Proper sequencing of growth conditions can, for example, generate a biological population that exhibits a lower solids yield—that is, the biology converts a higher proportion of the waste to gas than to solids, thereby reducing the volume of solids that must be disposed of—and enhanced influent waste consumption efficiency. Higher proportions of facultative aerobes or facultative anaerobes can be grown by manipulation of conditions, as can populations with a higher content of nitrifiers. Filamentous biology such as Norcardia sp. can be discouraged, and enhanced levels of nutrients, cBOD, and nitrates can be developed for beneficial introduction into the main treatment process. Accordingly, biology customization can be targeted toward, for example, increasing the concentration of disposable solids at the expense of the biology itself, or reducing the nutrient content of the disposable solids.

Desired growth conditions may be achieved by effecting a selected order of aerobic, anoxic, and anaerobic conditions for varied lengths of time and repetitively controlling those conditions by measurement and reproduction of the oxidation-reduction potential (ORP), specific oxygen uptake rate (SOUR), and/or specific nitrogen uptake rate (SNUR). It should be stressed that these measurements do not represent ends in themselves; obtaining a target level ORP level, for example, will not generally suffice to achieve the objectives of the invention. Instead, such measurements are used as indicators of biological population in the context of a timing regimen, facilitating both control over and awareness of the changing process conditions so that the regimen can be effectively executed.

In one embodiment, a biological population that favors the conversion of particulate cBOD to soluble cBOD for utilization in the main process flow is generated by combining a portion of the incoming waste stream with activated sludge, mixing to achieve anaerobic conditions, allowing the material to settle and then decanting off a portion (e.g., one quarter) of the volume as high-load (high cBOD content) liquor back to the main treatment process to treat an intermediate high nitrate stream generated from the incoming waste. The decanted volume of the off-line process is then replaced with more waste stream material, desirably establishing the suspended solids content within a particular range, and the whole process then repeated. When the suspended solids content of the off-line process mixture eventually becomes too high for effective control of local conditions and mixing, a portion (e.g., half or a third) of the mixture may be removed either to the main process flow or to disposal, after which the process is repeated from the beginning; that portion of enhanced population not removed effects an accelerated rate of treatment by virtue of having been acclimated to both the conditions and function of the off-line process. This growth selection sequence may be continued indefinitely.

The high-load decant produced in accordance with the embodiment exemplified above is high in soluble cBOD, high in ammonia, and has a low ORP. Breakdown of the particulate cBOD and particulate NBOD into soluble cBOD and ammonia may be accomplished by and in the presence of facultative anaerobes at the expense of obligate aerobes and independent of the nitrifier content.

In another embodiment of the invention a biological population favoring the augmentation of biology low in solids yield may be produced by combining a portion of the incoming waste stream with activated sludge, mixing to achieve anaerobic conditions, mixing with aeration to achieve ORP-positive conditions, mixing without aeration to achieve anaerobic conditions, allowing the material to settle and then decanting off a portion (e.g., a quarter) of the volume as high-load liquor back to the main treatment process to treat the incoming waste. If low-load decant is desired, then an additional step of mixing with aeration is performed before decanting back to the main treatment process. In either case, the decanted volume is then replaced with more influent waste stream material, desirably establishing the suspended solids content within a particular range. The whole process may then be repeated once or twice. After this, a portion (e.g., one third) of the completely mixed contents of the off-line process are removed to the main process flow, after which the process may be repeated from the beginning. This selective growth sequence may be continued indefinitely, the initial exposure of biology to food under anaerobic conditions competitively enhancing the number of facultative anaerobes and facultative aerobes capable of cBOD utilization, and the repetitive sequence maintaining (and further increasing by competition) the numbers of such facultative anaerobes and facultative aerobes. The numerically enhanced population of facultatives returned in the mixed decant produced by this embodiment is useful to selectively produce and augment a biological population which is biologically efficient (low in solids yield per weight of cBOD converted to gases) and which is capable of converting raw influent waste into gases without always being under aerated and/or aerobic conditions.

In yet another embodiment of the invention, high-solids-yield organisms are reduced and nitrification/denitrification capacity is improved. This may be accomplished by combining a portion of the incoming waste stream with activated sludge and mixing initially with aeration to achieve aerobic conditions and low ammonia content. The repetitive process begins with mixing without aeration while adding additional influent waste stream material, mixing with aeration to achieve a positive ORP and a significant dissolved oxygen content, stopping the mixing and aeration, allowing the material to settle and the dissolved oxygen content to dissipate, adding more waste stream material and repeating the aeration sequence, then decanting off a portion (e.g., one quarter) of the volume back to the main treatment process. The above steps may be repeated, after which a portion (e.g., one third) of the off-line mixture remaining is removed to the main process flow.

The latter decanted volume is replaced with more activated sludge, desirably establishing the suspended solids content at not more than 7,500 mg/l by the addition of sufficient influent waste stream material, as needed. The process is preferably repeated from the initial aeration sequence through to the return of an enhance population, and the entire process continued indefinitely. The intermediate decant produced by this embodiment is low in nutrient content and is useful in dilution of high strength influent waste; the resulting biological population returned at the end of each sequence is enhance in low solids-yield organisms (facultative aerobes capable of utilizing nitrate and oxygen as energy sources) and enhanced in its population of nitrifiers. With such and enhanced population regularly returned to the main process flow, the main process will be improved in both nitrification and denitrification rate and efficiency as it will be enhanced in the number of nitrifiers and facultative aerobes.

In still another embodiment, a biological population that disfavors filamentous biology or is severely diminished in the numbers of filamentous organisms is generated by combining a portion of the influent waste stream with activated sludge, mixing to achieve and maintain anaerobic conditions for a period of time, stopping the mixing, mixing again, then mixing and aggressively aerating to achieve a highly positive ORP, allowing the material to settle and then decanting off a volume with the biological population diminished in filamentous organisms back to the main process to treat the incoming waste. This embodiment selects against filamentous organisms by elimination of consistently low food to biomass conditions in which they thrive (by virtue of their high surface area to volume ratio) and by favoring conditions that enhance the population of facultative aerobes and nitrifiers.

A second aspect of the invention provides for the improved terminal treatment of waste solids produced by the waste treatment process as a whole by minimizing the quantity of solids that must be disposed of. Application of one or more of the embodiments to enhance the production and maintenance of low yield organisms in the main process flow allows and provides for a total suspended solids content in the main process flow that has lower biological content and a higher content of non-degraded organic (lint, hair, etc.) and inorganic content. In addition to the reduction of solids amounts (and volume) to be disposed of by virtue of the greater conversion to gases of the influent waste stream, the increased inorganic and non-degraded organic content can be concentrated more easily by various gravity and mechanical means normally employed by those familiar with the art of solids handling. Thus the volume of waste to be disposed of is further reduced.

A third aspect of the invention relates to apparatus for the implementation of the foregoing methods. For example, in one embodiment influent waste stream and activated sludge materials are combined in a treatment vessel, the growth of the desired biological population is controlled for, and a means is provided for drawing off a portion of the generated population and using it in another treatment vessel. A controllable aerator may be provided in the first treatment vessel.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
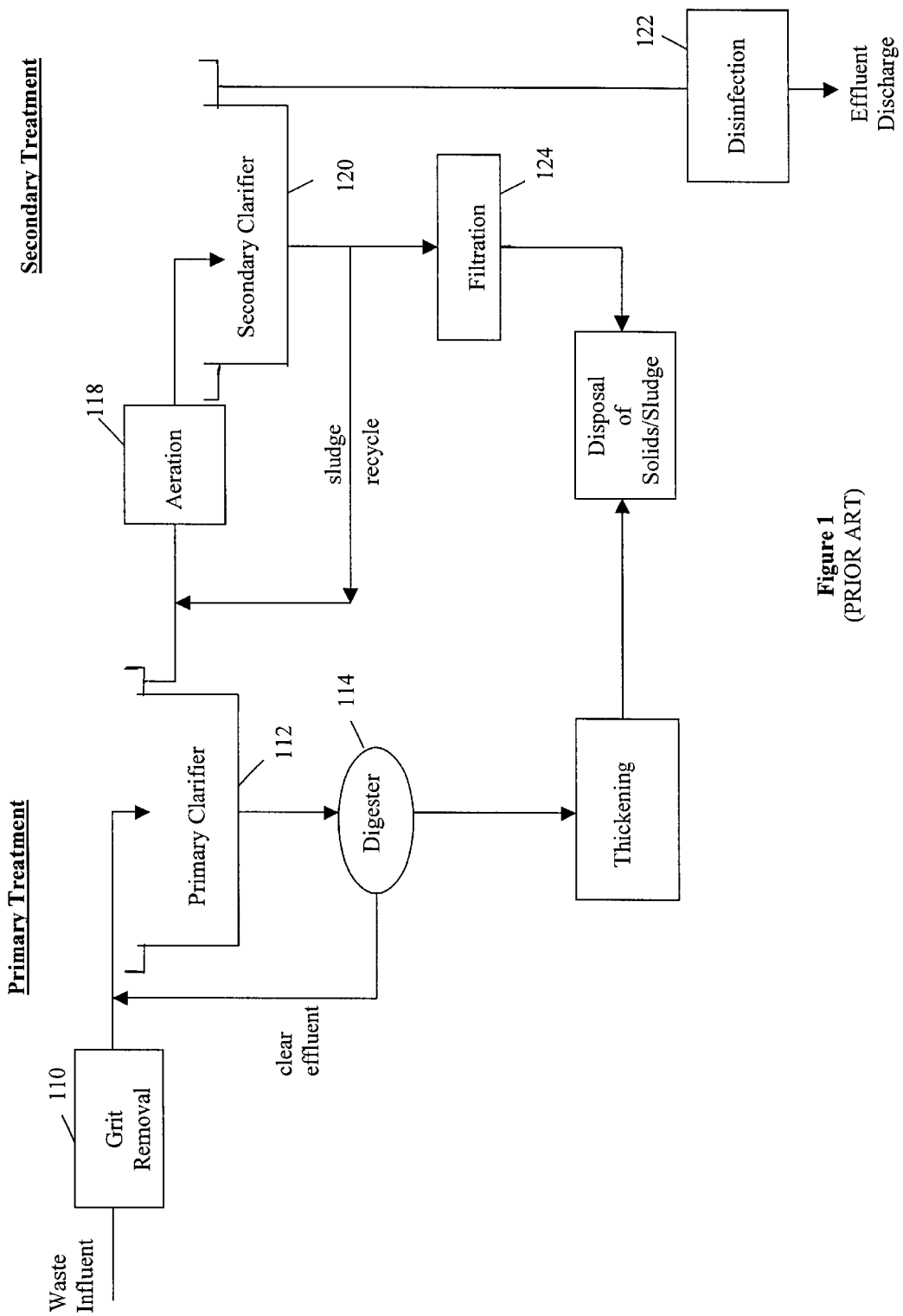
FIG. 1 shows a waste treatment process, representing a basic flow sequence that is well-known in the art and to which the present invention may be applied.

The bacteriological populations used to treat wastewater and its residuals may be adjusted and controlled by the off-line manipulation of a growth environment. Such a growth environment may be conveniently established in equipment that is not regularly used within an existing waste treatment process. For example, an aerobic digester previously used as a terminal solids handling device may be used as an extension of the wet stream treatment process in one or more embodiments of the present invention.

By these means conditions may be generated that favor low solids-yield microorganisms, high removal-efficiency microorganisms, provide high or low load return material for the main treatment process, minimize the formation of filamentous biology, and/or provide for the consumption of residual sludge (to minimize its volume). These and other biological classes may be formed by the methods and apparatus disclosed below.

One way to quantify the operating characteristics of a water or wastewater treatment facility is by ORP, the techniques of which are familiar to those skilled in the art. As seen in Table 1, growth of filamentous Norcardia sp. is especially favored in an ORP range of about −50 to +50 mV which range is also typified by low dissolved oxygen content (microaerobic) concurrent with low amounts of soluble cBOD. These preferred conditions for growth and replication of Norcardia sp. result in their enhanced population which gives unfavorable settling, plugging, and higher yield characteristics to the overall biological population and suspended solids of the main treatment process. Hence, waste treatment plant operation is hindered by maintaining conditions in this microaerophilic range that may be necessitated by high plant throughput rates.

TABLE 1

| Region | ORP Range (mV) | Example Biology |
|---|---|---|
| Obligate anaerobic | < −400 | Methanogens |
| Facultative anaerobic | −400 to −200 | Sulfate reducing bacteria, Acidogens |

TABLE 1-continued

| | ORP Range (mV) | Example Biology |
|---|---|---|
| Facultative aerobic | −200 to +150 | Bacillus spp., Pseudomonas spp, |
| Microaerophilic | −50 to +50 | Norcardia sp., Type 1701, Sphaerotilus natans |
| Obligate aerobic | +50 to +200 | Nitrosomonas and Nitrobacter |
| Condition | | |
| Aerobic | > +50 | |
| Anoxic | −150 to +50 | |
| Anaerobic | < −150 | |

These factors (and more) may be mitigated by the present invention. For example, a mixture containing certain amounts of waste influent and waste activated sludge may be customized by controlling factors such as solids content, residence time, mixing with air, mixing without air, subsequent addition of influent or sludge, and/or the selective removal of certain fractions of the mixture to achieve certain biological results including the demise of certain biological populations and the enhancement of other, preferred populations.

The invention may be used in several modes. In the "selector" mode an off-line mixture is customized to provide a particular biological profile for return to the main treatment process that will favor the presence of one or more classes of microorganisms, and disfavor the presence of microorganisms that are adverse to the processing objectives. The desired combination of favorable and unfavorable conditions for growth is obtained in the selector as described herein. When the desired biology is returned to the main treatment process, providing a desired biology population with even a slight population advantage may result in a significant operational enhancement, because the competitive balance between the populations will have been shifted.

The invention may also be operated in the "collector" mode, whereby the off-line process is operated as a digester, with the goal of minimizing the yield of solids and collecting these for disposal. Thus, in collector mode, the off-line mixture is concentrated with or without additional treatment. The combined effect of these two modes of operation is minimizing the quantity of residual solids for ultimate disposal beyond what would normally be possible if a system were operated in a conventional fashion while enhancing the performance of the main process.

Elutriation with raw influent waste is one technique that may be used for the generation of specialized biology populations. Traditionally, elutriation as used in waste treatment processes would be for the purpose of reducing the inorganic content of a specific volume of waste solids by dilution with water of a lesser inorganic content (dissolved or undissolved). In the present invention, elutriation involves exchanging the free water of dilution during the selection process to achieve reduced inorganic content while concurrently increasing the organic content of the volume by adsorption and absorption of cBOD from the raw influent waste. This exchange of reduced inorganic content concurrent with increased cBOD is used to strategically favor the formation of the class of biology desired as those classes capable of capture and retention of "food" will have a competitive advantage for growth and replication. Directly related is the technique of strategic introduction of high strength influent flow in the absence of oxygen (air) supply to a given biological population. Introduction of this material during the mixed/unaerated cycle results in a competitive advantage to those species capable of fixing and retaining cBOD and/or NBOD for subsequent growth and replication. The present invention uses these techniques in off-line processes for the specific enhancement of biological populations and provides for their use in the mainstream treatment processes by production of such high strength (high cBOD) streams that may be delivered to the main treatment process under conditions of controlled time and amount. Since the selector process output is returned to the main treatment process there are no effluent discharge compliance issues that limit how far the process may be pushed, and so the process may be operated to fully maximize the biological results achieved.

Customized biological populations may be generated to achieve specific objectives. Example 1 below teaches how to generate a biological population that converts particulate cBOD into soluble cBOD for utilization. The population of organisms selectively enhanced allows for generation of a high cBOD stream to be returned under controlled conditions and for generation of a biological population that has greater capacity for reduction of particulate to soluble cBOD. This is useful to reduce solids content, or to provide food during periods of low influent BOD content to help sustain the existing population of microorganisms. Example 2 below teaches how to generate low-yield bacteria. Use of these microorganisms results in less residual solids formation, such that disposal quantities and costs are reduced. Additionally, the lower solids content results in energy savings since fewer solids need to be processed and transported through the mainstream processes.

The embodiment of Example 3 teaches how to improve the yield characteristics of the whole while concurrently improving nitrification/denitrification capability and capacity. This invention is particularly useful for facilities that have difficulty meeting their environmental effluent discharge requirements for nitrogen content. Example 4 teaches a method for reducing the formation of filamentous biology. These microorganisms are especially troublesome for plant operation and efficiency in that they do not settle well, do not filter well, and are largely gram positive (a general characteristic of high solids yielding species).

Lastly, Example 5 teaches a method for the off-line minimization of residual solids content, prior to disposal. Operated as a collector subsequent to operation in selector mode, the method of this example may be employed repetitively until further consumption and denitrification is no longer achieved after the residual solids have been minimized by specific selection techniques embodied in the present invention.

Figure 2:
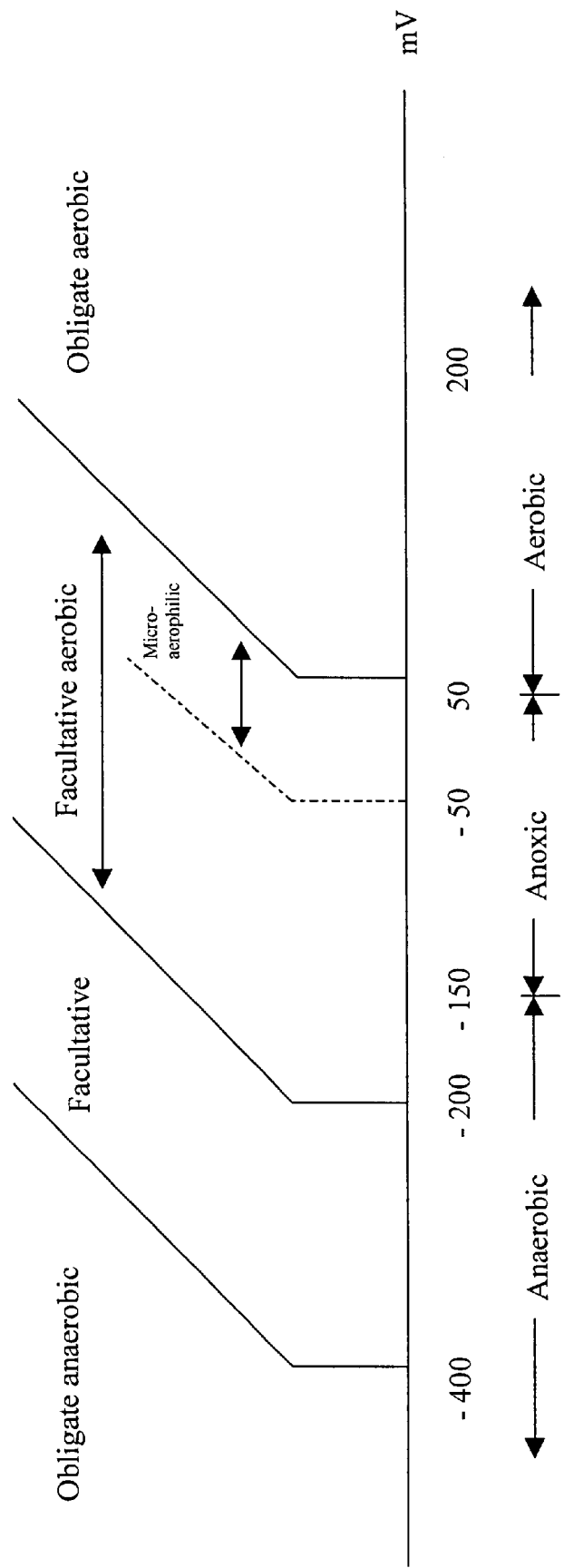
FIG. 2 illustrates the ORP ranges in which different types of biology populations tend to predominate.

As illustrated in FIG. 2 and in Table 1, various types of microorganisms thrive in environments of different ORP ranges. Dissolved oxygen content is not always indicative of ORP. Other methods may be employed to measure which microorganisms are favored, such as Specific Oxygen Uptake Rate (SOUR) and Specific Nitrogen Uptake Rate (SNUR). The operational control of the sequence of conditions by ORP, SOUR, SNUR, or other description of biological conditions is not intended to be all inclusive, limiting, or otherwise required for the implementation of various embodiments.

Also affecting the biological selectivity is the quantity of biological solids present. As waste treatment plant throughput rates increase generally so also do the volumes of residual sludge produced, requiring increased amounts of solids to be sent out for disposal. Increased plant throughput normally is thereby linked to increased disposal requirements. The fixed volume available for processing the influent mandates that the treated materials spend less time within the confines of the treatment process, including the generated solids. However, some plants have additional solids retention capability, thereby altering the ratio of solids to effluent and impacting the inherent biological selectivity. This variation in solids content is not known to be of practical usefulness to those who operate waste treatment plants. Control of the fraction of biological solids, and in particular the overall reduction of its amount as a whole is used to advantage by the biological selection process of the invention.

As mentioned earlier, some waste treatment plants supplement the incoming waste flow with nutrients to support the biological destruction processes. For example, as detailed below, the invention may be used to generate high- or low-load return to the treatment plant. Low-load material is typically high in ORP and may be also high in nitrate content, while high-load material is generally low in ORP and may be high in one or more of soluble cBOD, ammonia, and/or organic nitrogen. This choice may be made during selector operation virtually independent of the selection process, allowing these return materials to be strategically chosen and provided to the main treatment process during the appropriate portion of the diurnal cycle. For example, this could be of benefit in the following situation.

If the treatment plant is underloaded, a low-ORP, high-load return containing organic and nitrogen oxygen demand could be provided to help feed the microorganisms in the aeration process. Conversely, a high-ORP, low-load return might be preferred for times when the plant requires oxygenation assistance, in which case the high nitrate content also may be used to help sustain the facultative biology. In this manner the filamentous microaerophiles are stressed, helping to reduce the organic demand and allowing the aeration process to have sufficient aeration capacity during otherwise high loading periods to attain high ORP conditions in the mainstream process, further discouraging filamentous organisms.

The technique is especially useful for plants that have excessive hydraulic loading and cannot aerate their way past the preferred filamentous formation range, instead utilizing their air introduction to immediately start removing BOD/cBOD. (To prevent filament formation, it would be necessary to operate without residual oxygen until the BOD is removed by adsorption, absorption, or conversion to gases, then aerate to ORP levels above the preferred filament formation range.) Without use of the present invention, the steps required to avoid preferential conditions for filamentous organisms would limit the throughput capacity of the treatment plant. The situation is exacerbated at high food-to-microorganism (F/M) ratios, where an everincreasing amount of dissolved oxygen is required to prevent the formation of filamentous biology.

However, for situations such as these where the aeration system of the main process flow is unable to provide adequate oxygenation to avoid excessive filamentous growth, then the high-nitrate source generated by the invention may be used to supplement the oxygen supply. In this manner the nitrate source may be used during times of peak influent flows to supplement the aeration process, thereby preventing the microaerophiles (filamentous biology) from taking advantage of the low dissolved oxygen conditions. Proper sequencing of the selector operation may thereby be provided to match selector return with the peak demand requirements of the main treatment process. Further benefits may be obtained concurrently by off-line selection against filamentous organisms and/or by selection of biological populations that are both more efficient in their use of oxygen (facultative aerobes) and/or by selection and preferential cultivation of populations that do not require oxygen sources for conversion of cBOD to gases.

Another embodiment of the invention, still operating in selector mode, facilitates minimizing the solids volume a waste treatment plant must send out for disposal. Off-line operating conditions are selected which enhance the population of low-yield organisms to the equilibrium point where the death and decay of the organisms is offset by the lower yield generation (i.e., the increase in biological solids is balanced by the reduction in overall solids yield), or by operation of the process to accelerate the decay sufficiently to achieve that same equilibrium. This may be achieved by decreasing the ORP to <−150 mV, or preferably to <−200 mV and then increasing the ORP to >100 mV, or preferably to >150 mV. The resulting biological population may then be used to augment the solids of the main process flow resulting in minimization of the solids generated initially and concurrently helping the effluent to comply with discharge water quality requirements.

Elements of the same method may be used to advantage in the collector mode of operation, when a limited amount of non-degradable content is present. This method is detailed in Example 5 below. Operation of the terminal treatment/stabilization process serves to minimize the overall amount of material that must be disposed of by a waste treatment plant. By this method residual solids are converted to solubilized biomass and returned to the main treatment process for consumption. In collector mode, the residual non-solubilized materials are disposed of after maximizing the solids content to achieve minimum solids volume for subsequent processing. The proportional frequency of operating in "selector" mode versus the terminal "collector" mode is determined by the amount of non-degradable content of the influent material to be treated. The number of cycles performed by the collector to concentrate and maximize a given mass of material is limited primarily by the ratio of biological solids to non-degradable materials and by the relative amount of non-degradable content originally present.

Figure 3:
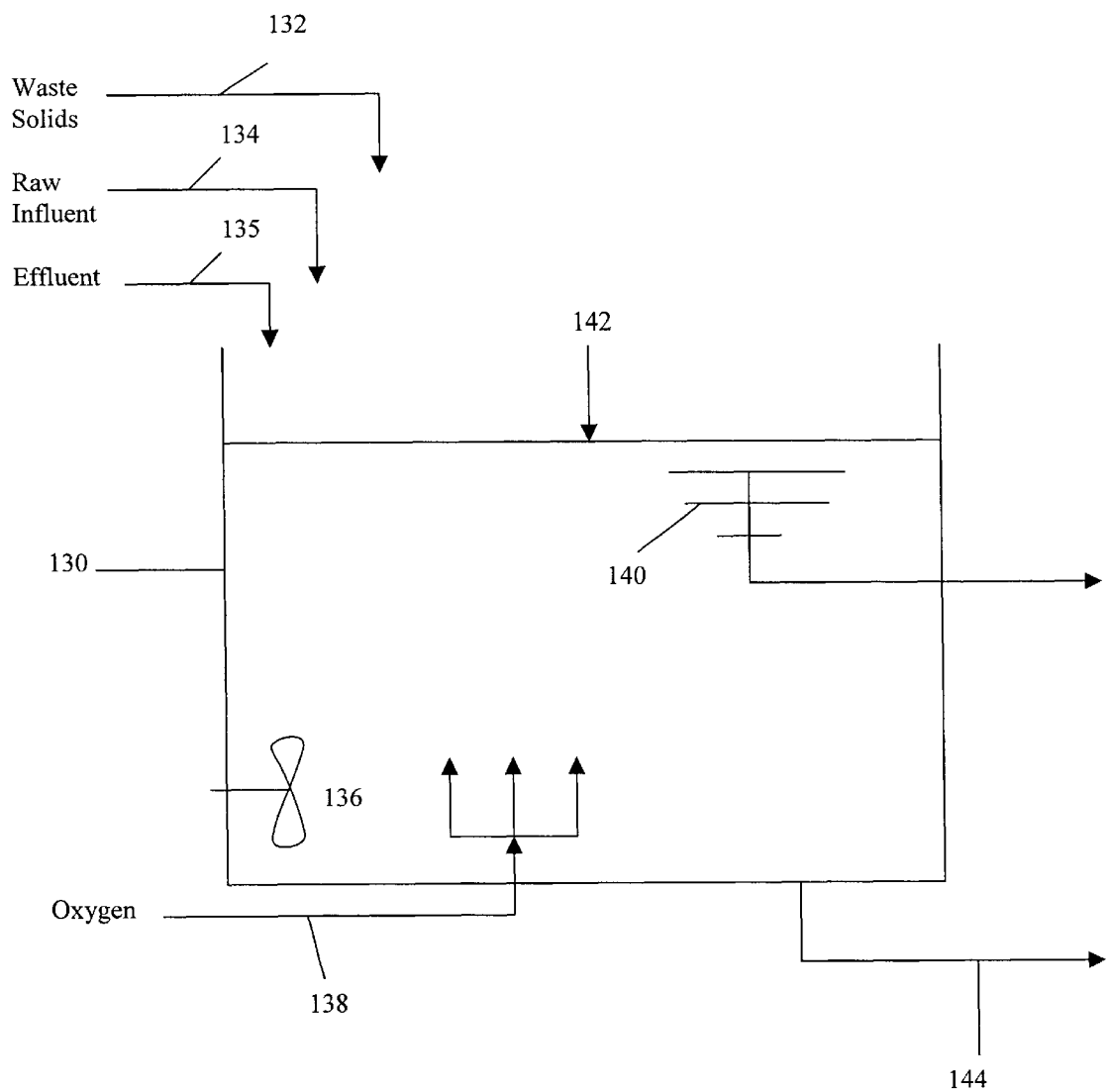
FIG. 3 is a schematic depiction of an apparatus that may be used to implement the present invention.

The methods summarized above may be conveniently implemented by the apparatus illustrated in FIG. 3. Such an apparatus may be conveniently and inexpensively obtained by making slight modifications to old, perhaps unused waste treatment plant equipment, such as an old digester. The apparatus comprises a vessel, such as a tank 130, a supply of waste solids 132, a supply of raw influent 134, a supply of effluent 135, a mixer 136, a supply of air or oxygen 138 (either or both of these may be used effectively), an upper removal device 140 to remove, at varying elevations, volume such as decant from near the surface 142 of the liquid under treatment, and a lower removal device 144 to remove volume from near the bottom of the tank 130. Upper removal device 140 may consist of, for example, a variable-height overflow weir located at the perimeter of the tank 130, or it could be an internal overflow weir with a variable height adjustment. The height adjustment could be achieved by elevating or lowering the inlet end of the weir, or by having multiple input points at varying elevations and blocking off the input points from which the decant flow is not desired, thereby providing for a controllable decant amount. This blocking can be done by various means, automated or not.

Specific embodiments of the invention may negate the need for one or more of the above-listed requirements, and they may be implemented in different ways. For example, the mixer may be oriented vertically or horizontally, and supported and/or driven from the top, bottom or the side of the vessel or a pump may be used for mixing internally transferring bulk liquid flows from one location to another within the tank. The supply of air or oxygen 138 may be introduced by different means, from above or below the liquid surface, and different input rates can be used. The apparatus described is effective for performing the steps of the methods detailed below.

In operation, the illustrated apparatus serves as an off-line processing environment facilitating growth of customized biological populations. New influent received from the main treatment process via line 134 is judiciously combined with appropriate excess or waste solids to achieve the necessary growth conditions. Decanted liquid obtained from upper removal device 140 is returned as appropriate to the main treatment process. Material including beneficially derived biological populations are removed via lower removal device 144 and returned to the main treatment process when operating in selector mode, or disposed of when operating in collector mode. The following examples may be practiced using a device as discussed above, and are presented for purposes of illustration and are not intended to limit the application of the invention.

EXAMPLES

Example 1

The following procedure selects for facultative anaerobes, independent of nitrifiers, at the expense of obligate aerobes, to specifically augment biology that rapidly breaks down particulate cBOD into soluble cBOD for utilization.

1. Fill tank 130 with a combination of excess activated sludge and raw influent, providing a nominal suspended solids concentration of between 3,000 and 5,000 mg/liter.
2. Mix contents of tank 130 using mixer 136 without aeration until the ORP is anaerobic, but not so low as to evoke sulfide generation by sulfate reducing bacteria, should there be sulfate present in the raw influent or waste sludge. This mixing should last for about 4 to 8 hours.
3. Stop the mixing and allow the mixture to settle, providing a decantable volume of at least 25% of the volume of tank 130. This will require about 2 to 4 hours.
4. Remove the high cBOD, high ammonia, low ORP ("high load") decant material via the upper removal device 140 to the plant treatment process when desired.
5. Replace the removed volume with raw influent and repeat steps 2 through 4 until the remaining suspended solids content reaches 7,500 to 10,000 mg/liter. This will generally require between 4 and 10 repetitions of these steps.
6. While mixing with mixer 136, return about half of the volume of tank 130 to the plant treatment process.
7. Repeat steps 1 through 6 as necessary.

Example 2

The following procedure selects for facultative anaerobes and aerobes, preserving nitrifiers, at the expense of obligate aerobes, to specifically augment biology low in yield. This is particularly useful for the minimization of residual solids.

1. Fill tank 130 with a combination of excess activated sludge and raw influent, providing a nominal suspended solids concentration of between 5,000 and 7,500 mg/liter.
2. Mix contents of tank 130 using mixer 136 without aeration until the ORP is anaerobic, but not so low as to evoke sulfide generation by sulfate reducing bacteria, should there be sulfate in the raw influent or waste sludge. This mixing should last for between 8 hours and 3 days.
3. Continue mixing with mixer 136, and aerate tank 130 "aggressively" until the ORP is >100 mV for 24 hours, >150 mV for 12 hours, or >200 mV for 4 hours.
4. Stop the aeration but continue mixing until the ORP is anaerobic for at least 48 hours. If the ORP does not continue to fall by at least 10 mV per hour, add 3–10% by volume of raw influent.
5. Stop the mixer 136 and allow the contents of tank 130 to settle, to provide a decantable volume of at least 25% of the volume of tank 130. This will take approximately 2 to 4 hours.
   a. If a high load return is desired, decant to the treatment process.
   b. If a low load return is desired, aerate the mixture and mix using mixer 136 until the ORP is >100 mV for 1 hour. Then stop the mixing and aeration, allow settling and then decant to the treatment process.
6. Replace the decanted volume with excess activated sludge from the supply of waste solids 132, only as along as the solids content remains <7,500 mg/liter. If they are higher then dilute by addition of raw influent.
7. Repeat steps 2 through 6 twice.
8. While mixing with mixer 136, remove ⅓ of the volume of tank 130 to the treatment plant process.
9. Repeat steps 1 through 8 as necessary, taking care to maintain the suspended solids concentration below 10,000 mg/liter, and preferably at less than 8,000 mg/liter.

Example 3

The following procedure selects for facultative aerobes and nitrifiers to reduce high yield organisms, and improves the nitrification/denitrification capacity. If available, a recycle stream high in ammonia and cBOD content can be used in place of, or in combination with the raw influent, as long as the cBOD (mg/liter) to $NH_3$—N (mg/liter) ratio is greater than 3. Note that this ratio is referenced to ammonia nitrogen, not Total Kjeldahl Nitrogen (TKN).

1. Fill tank 130 to approximately 75% full with activated sludge at a suspended solids concentration of between 2,500 and 7,500 mg/liter.
2. Mix contents of tank 130 using mixer 136 and with aeration until the ORP is aerobic and the ammonia content is <0.1 mg/liter.
3. Stop the aeration.
4. With continued mixing, fill about another 5 to 10% of the volume of tank 130 with additional raw influent. Monitor the ORP and nitrate concentrations until the nitrate concentrations are <0.1 mg/liter. This will take approximately 2 to 4 hours.
5. Continue to mix the tank contents, and begin to aerate tank 130 until the ORP is >100 mV for 4 hours, >150 mV for 2 hours, or >200 mV for 1 hour, and the dissolved oxygen concentration is >3.0 mg/liter for about 1 hour.
6. Stop the mixing and aeration for at least 4 hours, or until the observed dissolved oxygen concentration is <0.2 mg/liter, whichever is longer.

7. Repeat steps 4 through 6 two more times.
8. Remove the top 25% of the volume of tank 130, as decant. If there are suspended solids within this 25%, remove them also.
9. Repeat steps 4 through 8.
10. Restart the mixing, and remove another 25% of the tank volume to the plant treatment process.
11. Replace the volume removed in step 10 with excess activated sludge, maintaining the solids concentration at <7,500 mg/liter. If necessary, add additional raw influent to keep the solids concentration below this level.
12. Repeat steps 2 through 11 as necessary.

Example 4

The following procedure selects for facultative anaerobes and facultative aerobes, to generate a low yield biology population. It disfavors the formation of filamentous biology, such as Norcardia sp.

1. Fill tank 130 to at least 90% full with excess activated sludge, providing a nominal suspended solids concentration of between 3,000 and 10,000 mg/liter. Dilute the mixture with raw influent as required to keep the solids content below 10,000 mg/liter. Any dilution required may be done with plant effluent or mixed liquor from the main process flow, but the use of raw influent is preferred.
2. Mix contents of tank 130 using mixer 136 without aeration until the ORP is anaerobic, but not so low as to evoke sulfide generation by sulfate reducing bacteria, should there be sulfate present in the raw influent or waste sludge. This mixing should last for between 8 hours and 3 days, depending upon the ambient temperature and the temperature of the mixture. If the ORP stabilizes at over −200 mV then add 5% by volume of raw influent to the mixture, while mixing with mixer 136.
3. Turn off the mixing and wait for 48 hours, but mix the contents for a one hour period after 24 hours have passed. This needs to be done without aeration.
4. After the 48 hour period, resume mixing with mixer 136 and aerate the contents of tank 130 "aggressively" until the ORP is >100 mV for 16 hours, >150 mV for 8 hours, or >200 mV for 4 hours.
5. Repeat Steps 2 through 4.
6. Stop the mixing and aeration and allow the contents to settle for not more than 2 hours.
7. Remove to the treatment process all of the decantable volume, or 20% of the volume of tank 130, whichever is less.
8. Add raw influent to tank 130 until it is 90% full.
9. Repeat Steps 2 through 7.
10. While mixing with mixer 136, remove ⅓ of the volume of tank 130 to the plant treatment process.
11. Repeat steps 1 through 10 as necessary, taking care to maintain the suspended solids concentration below 10,000 mg/liter, and preferably at less than 8,000 mg/liter.

Example 5

The following procedure explains how to operate the invention as a collector. Contrasted with the method of Example 2 above, the primary objective of this method is to minimize the disposal volume of any residual solids, rather than to provide a low-yield biology population for return to the waste treatment process.

1. Fill tank 130 with a combination of activated sludge and raw influent, to provide a suspended solids concentration of between 5,000 and 7,500 mg/liter.
2. Mix contents of tank 130 using mixer 136 without aeration until the ORP is anaerobic, but not so low as to evoke sulfide generation by sulfate reducing bacteria, should there be sulfate in the raw influent or waste sludge. This mixing should last between 8 hours and 3 days.
3. Continue mixing with mixer 136, and aerate tank 130 "aggressively" until the ORP is >100 mV for 24 hours, >150 mV for 12 hours, or >200 mV for 4 hours.
4. Stop the aeration but continue mixing until the ORP is anaerobic for at least 24 hours. When the ORP is no longer falling by at least 10 mV per hour, proceed to the next step.
5. Stop the mixing and allow the tank contents to settle, providing the maximum decantable volume achievable within 24 hours.
   a. If a high load return is desired, then remove the decant to the treatment process.
   b. If low load return is desired, then aerate the mixture and mix with mixer 136, and maintain this until the ORP is >100 mV for a period of 1 hour. Then stop the mixing and aeration, allow the mixture to settle to obtain the maximum decant amount available as may be indicated by laboratory settleometer, and then decant the low load material to the treatment process.
6. Replace the decanted volume with activated sludge of the highest available solids content.
7. Repeat steps 2 through 6 until no further decant material is generated upon settling, taking care to not fill the top 5–10% of the volume in tank 130 with solids.
8. In a laboratory settleometer, without substantial aeration, mix for 1 hour a sample consisting 90% of a representative sample of the material contained in tank 130, plus 10% effluent. Allow the mixture to settle for 24 hours. If the volume of settled solids is less than 90% proceed to step 9 for further treatment. Otherwise, remove the contents of tank 130 to the solids disposal process as appropriate.
9. Add effluent to fill tank 130. Mix the contents with mixer 136 for between 1 and 4 hours, taking care to not aerate the mixture.
10. Stop the mixing and allow the tank contents to settle. Decant all available liquid.
11. Repeat steps 8 through 10 until there is no further increase in solids concentration, whereupon the solids mixture is ready for disposal.

By the above it can be seen that a highly useful apparatus and methods have been developed for improving the efficiency and effectiveness of waste treatment plant operations, both in terms of improving their existing treatment processes, and for minimizing the amount of waste disposal volumes to be managed. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   c. controlling the drawn-off portion of the waste stream so as to maintain, in the drawn-off portion, a second biological population having a second-biological population profile different from the first-biological population profile such that the second biological population exhibits a lower solids yield and a higher waste-digestion efficiency relative to the first biological population; and
   d. returning a fraction of the drawn-off portion to the treatment vessel following contact with the second biological population, the returned fraction including a portion of the second biological population.

2. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   c. controlling the drawn-off portion of the waste stream so as to maintain, in the drawn-off portion, a second biological population having a second-biological population profile different from the first-biological population profile such that the second biological population includes a lower proportion of filamentous biology than the first biological population; and
   d. returning a fraction of the drawn-off portion to the treatment vessel following contact with the second biological population, the returned fraction including a portion of the second biological population.

3. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   c. controlling the drawn-off portion of the waste stream so as to maintain, in the drawn-off portion, a second biological population having a second-biological population profile different from the first-biological population profile such that the second biological population inhibits the formation of filamentous biology more than the first biological population; and
   d. returning a fraction of the drawn-off portion to the treatment vessel following contact with the second biological population, the returned fraction including a portion of the second biological population.

4. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   c. controlling the drawn-off portion of the waste stream so as to maintain, in the drawn-off portion, a second biological population having a second-biological population profile different from the first-biological population profile such that the returned fraction contains a higher level of biological nutrients than the waste stream; and
   d. returning a fraction of the drawn-off portion to the treatment vessel following contact with the second biological population, the returned fraction including a portion of the second biological population.

5. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   c. controlling the drawn-off portion of the waste stream so as to maintain, in the drawn-off portion, a second biological population having a second-biological population profile different from the first-biological population profile such that the returned fraction contains a higher level of cBOD than the waste stream; and
   d. returning a fraction of the drawn-off portion to the treatment vessel following contact with the second biological population, the returned fraction including a portion of the second biological population.

6. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   c. isolating and controlling the drawn-off portion of the waste stream so as to maintain, in the drawn-off portion, a second biological population having a second-biological population profile different from the first-biological population profile, wherein the controlling step comprises:
      i. adding, to the drawn-off portion, a quantity of activated sludge to achieve a target suspended solids concentration; Amendment After Final
      ii. mixing the drawn-off portion without aeration to achieve anaerobic conditions without substantial sulfide generation; and
      iii. allowing settling to produce a decantable volume having an increased cBOD and ammonia content and a reduced ORP; and
   d. returning a fraction of the drawn-off portion to the treatment vessel following contact with the second biological population, the returned fraction including a portion of the second biological population, the fraction of the drawn-off portion conducted to the treatment vessel being taken from the decantable volume.

7. The method of claim 6 wherein the drawn-off portion is contained in an offline vessel, the undecanted drawn-off portion being conditioned for re-use by steps comprising:
   a. adding a portion of the waste stream material to the offline vessel to produce therein a mixture having a second target suspended solids concentration; and
   b. removing about half of the mixture.

8. The method of claim 7 wherein the second target suspended solids concentration ranges from 7,500 mg/l to 10,000 mg/l.

9. The method of claim 6 wherein the target suspended solids concentration ranges from 3000 to 5000 mg/l.

10. The method of claim 6 wherein the decantable volume is at least 25%.

11. A method of treating a waste stream, the method comprising the steps of:
  a. conducting at least a portion of the waste stream to a treatment vessel for treatment comprising contact with a first biological population having a first-biological population profile;
  b. drawing off a portion of the waste stream;
  c. isolating and controlling the drawn-off portion of the waste stream so as to maintain, in the drawn-off portion, a second biological population having a second-biological population profile different from the first-biological population profile, wherein the controlling step comprises:
    i. adding, to the drawn-off portion, a quantity of activated sludge to achieve a target suspended solids concentration;
    ii. mixing the drawn-off portion without aeration to achieve anaerobic conditions without substantial sulfide generation;
    iii. mixing and aerating until a positive ORP is achieved;
    iv. mixing without aeration to achieve anaerobic conditions; and
    v. allowing settling to produce a decantable volume with a higher loading; and
  d. returning a fraction of the drawn-off portion to the treatment vessel following contact with the second biological population, the returned fraction including a portion of the second biological population, the fraction of the drawn-off portion conducted to the treatment vessel being taken from the decantable volume.

12. The method of claim 11 wherein the undecanted drawn-off portion is re-used by steps comprising:
  vi. replacing the drawn-off fraction with activated sludge, and adding sufficient waste stream material to achieve a second target suspended solids concentration; and
  vii. repeating steps (ii) through (v).

13. The method of claim 20 wherein the second target suspended solids concentration is not more than about 7,500 mg/l.

14. The method of claim 12 wherein after about two repetitions of steps (vi) and (vii) the undecanted drawn-off portion is treated according to steps comprising:
  viii. removing about ⅓ of the undecanted drawn-off portion; and
  ix. repeating steps (i) through (viii).

15. The method of claim 11 wherein the target suspended solids concentration ranges from about 5,000 mg/l to about 7,500 mg/l.

16. A method of treating a waste stream, the method comprising the steps of:
  a. conducting at least a portion of the waste stream to a treatment vessel for treatment comprising contact with a first biological population having a first-biological population profile;
  b. drawing off a portion of the waste stream;
  c. isolating and controlling the drawn-off portion of the waste stream so as to maintain, in the drawn-off portion, a second biological population having a second-biological population profile different from the first-biological population profile, wherein the controlling step comprises:
    i. adding, to the drawn-off portion, a quantity of activated sludge to achieve a target suspended solids concentration;
    ii. mixing the drawn-off portion without aeration to achieve anaerobic conditions without substantial sulfide generation;
    iii. mixing and aerating until a positive ORP is achieved;
    iv. mixing without aeration to achieve anaerobic conditions;
    v. allowing settling to produce a decantable volume;
    vi. mixing and aerating until a positive ORP is achieved; and
    vii. allowing settling to produce a decantable volume with a lower loading; and
  d. returning a fraction of the drawn-off portion to the treatment vessel following contact with the second biological population, the returned fraction including a portion of the second biological population, the fraction of the drawn-off portion conducted to the treatment vessel being taken from the decantable volume.

17. The method of claim 16 wherein the undecanted drawn-off portion is re-used by steps comprising:
  viii. replacing the drawn-off fraction with activated sludge, and adding sufficient waste stream material to achieve a second target suspended solids concentration; and
  ix. repeating steps (ii) through (vii).

18. The method of claim 17 wherein the second target suspended solids concentration is not more than about 7,500 mg/l.

19. The method of claim 17 wherein after about two repetitions of steps (viii) and (ix) the undecanted drawn-off portion is treated according to steps comprising:
  x. removing about ⅓ of the undecanted drawn-off portion; and
  xi. repeating steps (i) through (x).

20. The method of claim 16 wherein the target suspended solids concentration ranges from about 5,000 mg/l to about 7,500 mg/l.

21. A method of treating a waste stream, the method comprising the steps of:
  a. conducting at least a portion of the waste stream to a treatment vessel for treatment comprising contact with a first biological population having a first-biological population profile;
  b. drawing off a portion of the waste stream;
  c. isolating and controlling the drawn-off portion of the waste stream so as to maintain, in the drawn-off portion, a second biological population having a second-biological population profile different from the first-biological population profile, wherein the controlling step comprises:
    i. adding, to the drawn-off portion, a quantity of activated sludge to achieve a target suspended solids concentration;
    ii. mixing the drawn-off portion with aeration to achieve aerobic conditions and reduced ammonia content;
    iii. stopping the aeration;
    iv. adding and mixing additional waste stream material;
    v. mixing and aerating until the ORP is positive and dissolved oxygen content is present;
    vi. stopping the mixing and the aeration; and
    vii. allowing settling to produce a decantable volume having a high content of facultative aerobes and nitrifiers; and
  d. returning a fraction of the drawn-off portion to the treatment vessel following contact with the second biological population, the returned fraction including a portion of the second biological population, the fraction of the drawn-off portion conducted to the treatment vessel being taken from the decantable volume.

22. The method of claim 21 further comprising the step of repeating steps (iv) through (vi) at least twice prior to the settling step.

23. The method of claim 21 wherein the undecanted drawn-off portion is conditioned for re-use by steps comprising:
   a. removing about ⅓ of the undecanted drawn-off portion;
   b. adding additional activated sludge to replace the removed undecanted drawn-off portion; and
   c. adding additional waste stream material to achieve a second target suspended solids concentration.

24. The method of claim 23 wherein the second target suspended solids concentration is not more than about 7,500 mg/l.

25. The method of claim 21 wherein the target suspended solids concentration ranges from about 2,500 mg/l to about 7,500 mg/l.

26. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   isolating and controlling the drawn-off portion of the waste stream so as to maintain, in the drawn-off portion, a second biological population having a second-biological population profile different from the first-biological population profile, wherein the controlling step comprises:
      i. adding, to the drawn-off portion, a quantity of activated sludge to achieve a target suspended solids concentration;
      ii. mixing the drawn-off portion without aeration to achieve anaerobic conditions without substantial sulfide generation;
      iii. stopping the mixing for a period of time;
      iv. mixing;
      v. mixing and aerating until the ORP is positive; and
      vi. allowing settling to produce a decantable volume having an increased content of facultative anaerobes and facultative aerobes; and
   d. returning a fraction of the drawn-off portion to the treatment vessel following contact with the second biological population, the returned fraction including a portion of the second biological population, the fraction of the drawn-off portion conducted to the treatment vessel being taken from the decantable volume.

27. The method of claim 26 wherein the undecanted drawn-off portion is conditioned for re-use by the step of:
   vii. adding additional waste stream material to achieve a second target suspended solids concentration.

28. The method of claim 27 further comprising the step of repeating steps (ii) through (vii).

29. The method of claim 27 wherein the undecanted drawn-off portion is prepared for re-use by removing about ⅓ of the undecanted drawn-off portion.

30. The method of claim 27 wherein the second target suspended solids concentration is not more than about 10,000 mg/l.

31. The method of claim 26 wherein the target suspended solids concentration ranges from about 3,000 mg/l to about 10,000 mg/l.

32. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;
   c. isolating and controlling the drawn-off portion of the waste stream so as to maintain, in the drawn-off portion, a second biological population having a second-biological population profile different from the first-biological population profile, wherein the controlling step comprises:
      i. adding, to the drawn-off portion, a quantity of activated sludge to achieve a target suspended solids concentration;
      ii. mixing the drawn-off portion without aeration to achieve anaerobic conditions without substantial sulfide generation;
      iii. mixing and aerating until the ORP is positive;
      iv. stopping the aeration but continuing the mixing; and
      v. allowing settling to produce a decantable volume having a higher loading and a volume containing settled solids; and
   d. returning a fraction of the drawn-off portion to the treatment vessel following contact with the second biological population, the returned fraction including a portion of the second biological population, the fraction of the drawn-off portion conducted to the treatment vessel being taken from the decantable volume.

33. The method of claim 32 wherein additional treatment is provided by steps further comprising:
   vi. adding additional activated sludge to produce a concentrated mixture; and
   vii. repeating steps (ii) through (vi) until the volume containing settled solids corresponds to a target volume.

34. The method of claim 33 wherein the target volume is about 90 to 95% of the drawn-off portion.

35. The method of claim 33 further comprising the steps of:
   a. determining a solids content of the concentrated mixture;
   b. disposing of the concentrated mixture as waste if the solids content exceeds a predetermined threshold; and
   c. if the solids content does not exceed the predetermined threshold, (1) adding an additional portion of the waste stream material to the concentrated mixture, (2) mixing, (3) allowing settling to produce a decantable volume, (4) drawing off the decantable volume, and (5) repeating steps (1) through (4) until no further increase in solids content is achieved.

36. The method of claim 35 wherein the predetermined threshold solids content is about 90% of the drawn-off portion.

37. The method of claim 32 wherein the target suspended solids concentration ranges from about 5,000 mg/l to about 7,500 mg/l.

38. A method of treating a waste stream, the method comprising the steps of:
   a. conducting at least a portion of the waste stream to a treatment vessel for treatment comprising contact with a first biological population having a first-biological population profile;
   b. drawing off a portion of the waste stream;

c. isolating and controlling the drawn-off portion of the waste stream so as to maintain, in the drawn-off portion, a second biological population having a second-biological population profile different from the first-biological population profile, wherein the controlling step comprises:
  i. adding, to the drawn-off portion, a quantity of activated sludge to achieve a target suspended solids concentration;
  ii. mixing the drawn-off portion without aeration to achieve anaerobic conditions without substantial sulfide generation;
  iii. mixing and aerating until the ORP is positive;
  iv. stopping the aeration but continuing the mixing;
  v. allowing settling;
  vi. aerating and mixing until a positive ORP is achieved; and
  vii. allowing settling to produce a decantable volume having a lower loading and a volume containing settled solids; and
d. returning a fraction of the drawn-off portion to the treatment vessel following contact with the second biological population, the returned fraction including a portion of the second biological population, the fraction of the drawn-off portion conducted to the treatment vessel being taken from the decantable volume.

39. The method of claim 38 wherein additional treatment is provided by steps further comprising:
  viii. adding additional activated sludge to produce a concentrated mixture; and
  ix. repeating (ii) through (viii) until the volume containing settled solids corresponds to a target volume.

40. The method of claim 39 wherein the target volume is about 90 to 95% of the drawn-off portion.

41. The method of claim 39 further comprising the steps of:
  a. determining a solids content of the concentrated mixture;
  b. disposing of the concentrated mixture as waste if the solids content exceeds a predetermined threshold; and
  c. if the solids content does not exceed the predetermined threshold, (1) adding an additional portion of the waste stream material to the concentrated mixture, (2) mixing, (3) allowing settling to produce a decantable volume, (4) drawing off the decantable volume, and (5) repeating steps (1) through (4) until no further increase in solids content is achieved.

42. The method of claim 41 wherein the predetermined threshold solids content is about 90% of the drawn-off portion.

43. The method of claim 38 wherein the target suspended solids concentration ranges from about 5,000 mg/l to about 7,500 mg/l.

44. A method of treating a waste stream, the method comprising the steps of:
  a. conducting at least a portion of the waste stream to a treatment vessel containing disposable solids, for treatment comprising contact with a first biological population having a first-biological population profile;
  b. drawing off a portion of the waste stream;
  c. controlling the drawn-off portion of the waste stream so as to maintain, in the drawn-off portion, a second biological population having a second-biological population profile different from the first-biological population profile;
  d. returning a fraction of the drawn-off portion to the treatment vessel following contact with the second biological population, the returned fraction including a portion of the second biological population; and
  e. introducing the returned fraction to the treatment vessel causing the disposable solids to increase in concentration at the expense of biology.

* * * * *

UNITED STATES PATENT AND TRADEMARK OFFICE
CERTIFICATE OF CORRECTION

PATENT NO. : 6,660,163 B2
DATED : December 9, 2003
INVENTOR(S) : Miklos

It is certified that error appears in the above-identified patent and that said Letters Patent is hereby corrected as shown below:

Column 16,
Line 43, please delete "Amendment After Final"

Column 17,
Line 40, please delete "claim 20", and insert in its place -- claim 12 --.

Signed and Sealed this

Twenty-fifth Day of May, 2004

JON W. DUDAS
*Acting Director of the United States Patent and Trademark Office*